United States Patent [19]
Currier et al.

[11] 3,967,523
[45] July 6, 1976

[54] POWER DRIVEN DRUM BEATER

[76] Inventors: George T. Currier, 470 Gregory Ave., Weehawken, N.J. 07087; Dennis M. Canavan, 242 River Road, North Arlington, N.J. 07032

[22] Filed: June 3, 1975

[21] Appl. No.: 583,426

[52] U.S. Cl............................................. 84/422 R
[51] Int. Cl.² ........................................ G10D 13/00
[58] Field of Search ..................... 84/422, 404, 407

[56] References Cited
UNITED STATES PATENTS

| | | | |
|---|---|---|---|
| 1,045,357 | 11/1912 | Anderson | 84/422 |
| 1,646,061 | 10/1927 | Lifshitz | 84/422 |
| 1,688,450 | 10/1928 | Corbett | 84/422 |
| 2,822,717 | 2/1958 | Slawienski | 84/422 |
| 3,747,464 | 7/1973 | Russell | 84/422 |
| 3,761,598 | 9/1973 | Haile | 84/404 |

Primary Examiner—Stephen J. Tomsky
Attorney, Agent, or Firm—Lackenbach, Lilling & Siegel

[57] ABSTRACT

A power driven drum beater is controlled by means of a foot pedal. The pedal device serves to close an electrical circuit for the actuation of a pivoted solenoid actuated beater mounted on a rod. The foot pedal is further pivotable enabling an electrical contact on the underside thereof to be brought into a desired position along a resistance selector for driving the beater with variable speed or intensity and at a variable rate.

37 Claims, 28 Drawing Figures

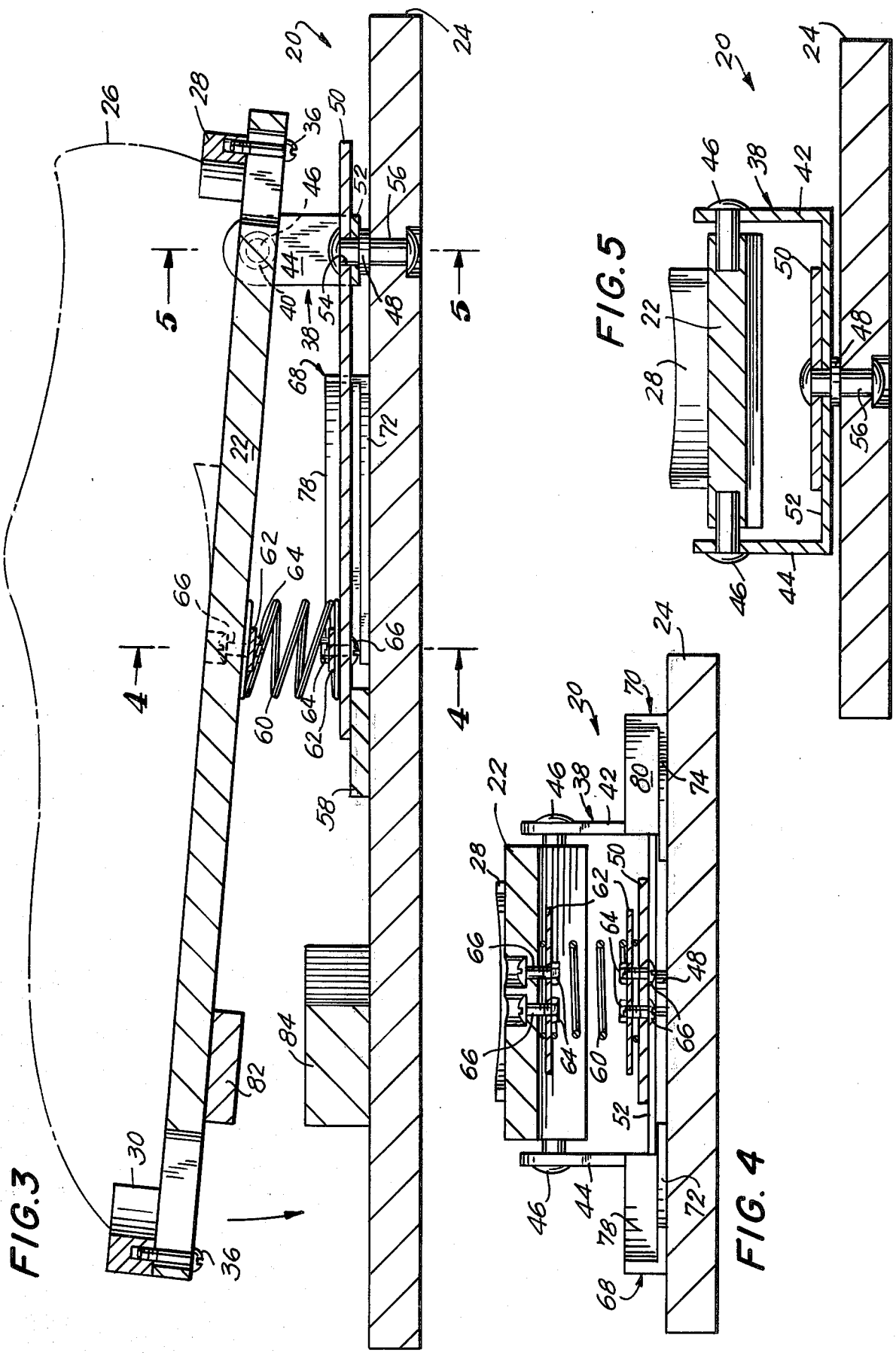

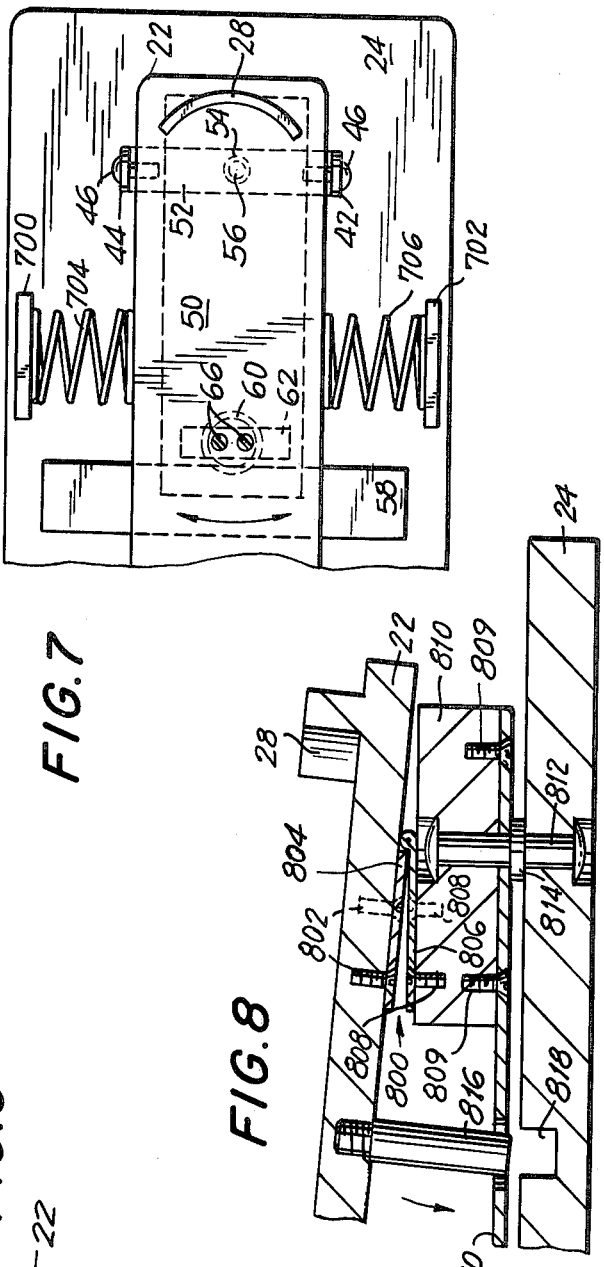

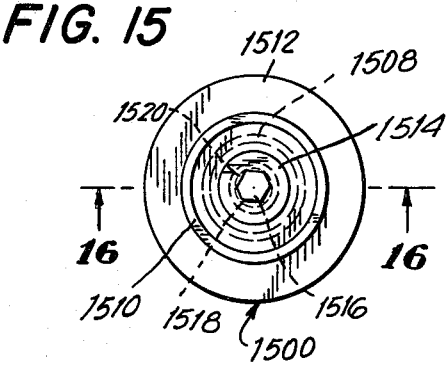
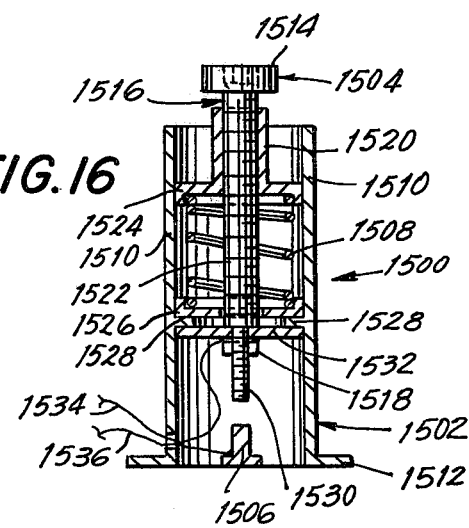
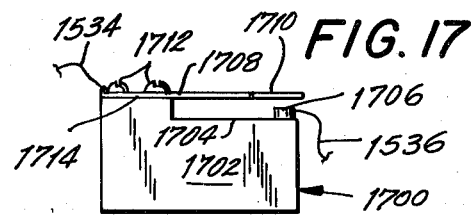
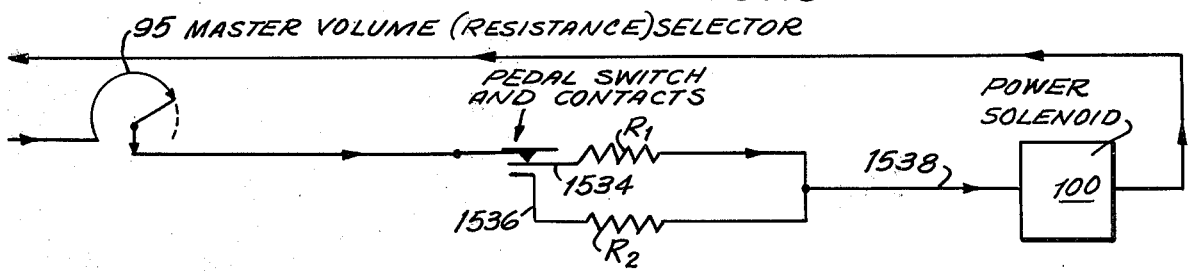
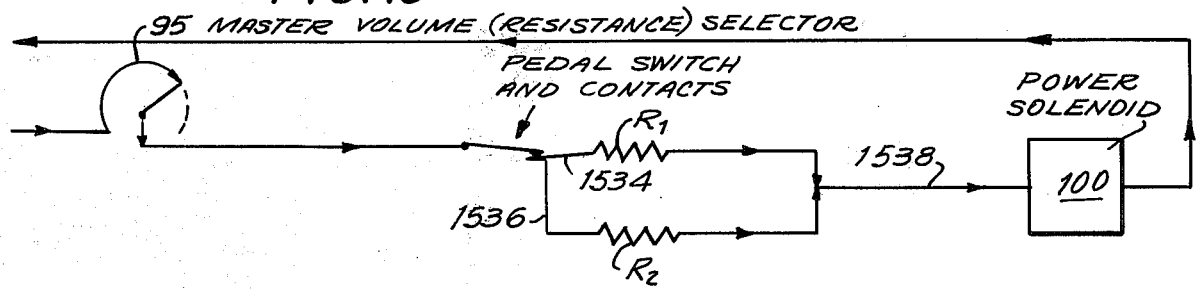
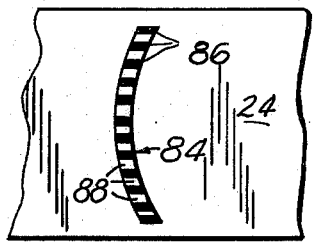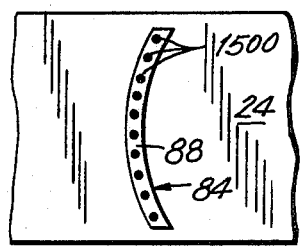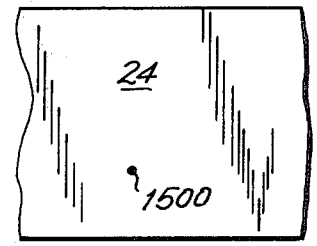

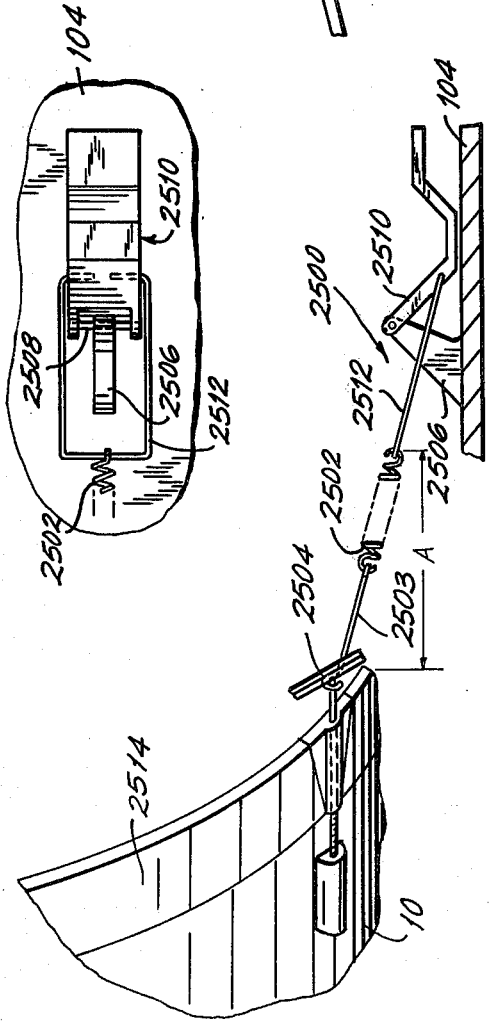

POWER DRIVEN DRUM BEATER

BACKGROUND OF THE INVENTION

This invention relates to an elecrically controlled and driven beater mechanism, and more particularly to a foot pedal control device and a solenoid actuated pivoted beater. The pedal device may be situated remote from a bass drum beater and includes a linear rheostat or a resistance selector to facilitate driving the beater with variable speed or intensity and at a variable rate.

In the prior art, electrically actuated devices have been heretofore attached to various types of drums. For example, in U.S. Pat. No. 1,045,357 an electrically controlled snare drum having a vibratory drum tapping device is played by means of a hinged foot treadle adapted to make electrical contact between a pair of contact points upon the depression of the treadle against the tension of a spring. Other patents, such as U.S. Pat. Nos. 1,646,061 and 2,822,717 teach various electrical devices, with electrical switches in the form of pedals, attached to musical instruments, such as a bass drum. The earlier patent employs pedal switches which are operated with the heel or toe of the musician's foot or both, in order to produce different effects, for instance, a single strike or a continuous vibration. The later issued patent pertains to motor driven sticks for a bass drum wherein the sticks are flexible and swingingly hinged at their lower ends to a foundation. Coil springs attached to the drumsticks are expanded or stretched so as to be under tension and the sticks are released, whereby the springs draw the sticks outwardly toward the drum head one at a time for beating the drum.

It is therefore a primary object of the invention to provide a novel and improved electrically actuated drum beater assembly which is readily adapted for use with a drum, such as a conventional bass drum, and one which requires less player energy and offers a greater number of controlled beats playable in a given time.

It is a further object of the invention to provide an improved drum beater which is relatively simple in its construction and which can be inexpensively manufactured, and one which permits remote operation of the bass drum.

These and other objects and advantages of the invention will become clear and apparent when consideration is given to the following details and description which, when taken in conjunction with the annexed drawing, describes, discloses, illustrates, and shows certain preferred embodiments or modifications of the present invention and what is believed to be the best mode of practicing the principles thereof. Other embodiments or modifications may be suggested to those having the benefit of the teachings herein, and such other embodiments or modifications are intended to be reserved especially as they fall within the scope of the subjoined claims.

BRIEF DESCRIPTION OF THE DRAWING

FIG. 3 is a longitudinal cross-sectional view taken along the line 3—3 of FIG. 2;

FIG. 4 is a transverse cross-sectional view taken along the line 4—4 of FIG. 3;

FIG. 5 is another transverse cross-sectional view taken along the line 5—5 of FIG. 3;

FIG. 6 is an enlarged, fragmentary sectional view of an alternate foot pedal construction in which the spring loaded foot pedal and/or spring force may be adjusted;

FIG. 7 is a fragmentary plan view of another alternate foot pedal with a pair of side coil springs for returning the swivel foot pedal to a central reference position;

FIG. 8 is a fragmentary, sectional view of a modified foot pedal showing a different pivot and swivel connection at the rear portion of the pedal;

FIG. 9 is a wiring diagram of the foot pedal control device;

FIG. 15 is a top plan view of an individual accent switch or electrical contact that may be used in the foot pedal control device;

FIG. 16 is a sectional view taken along the line 16—16 of FIG. 15;

FIG. 17 is another form of an accent switch which may be employed in the device of the present invention;

FIG. 18 is a schematic or wiring diagram of the invention, illustrating the accent switch circuitry for a soft beat;

FIG. 19 is a similar schematic view showing the accent switch circuitry for a loud beat;

FIG. 20 is a fragmentary plan view of the foot pedal base, showing the preferred manner in which the fixed contacts are placed;

FIG. 21 is another fragmentary plan view, showing an alternate manner for constructing the contacts;

FIG. 22 is a further fragmentary plan view, showing another manner in which a single fixed contact or accent switch contact may be positioned;

FIG. 25 and 26 are fragmentary views of a "beater to drum" device which permits a drummer to attach the drum beater of the invention to a drum;

FIG. 27 is a fragmentary view of a pedal solenoid, of the push type for simulating the rebound or kickbach of a pedal for facilitating the drummer's timing when using the device; and FIG. 28 is a schematic or wiring diagram of the pedal rebound system employing the pedal solenoid of FIG. 27, which may be employed in the practice of the present invention.

DESCRIPTION OF THE PREFERRED EMBODIMENT

Figure 1:
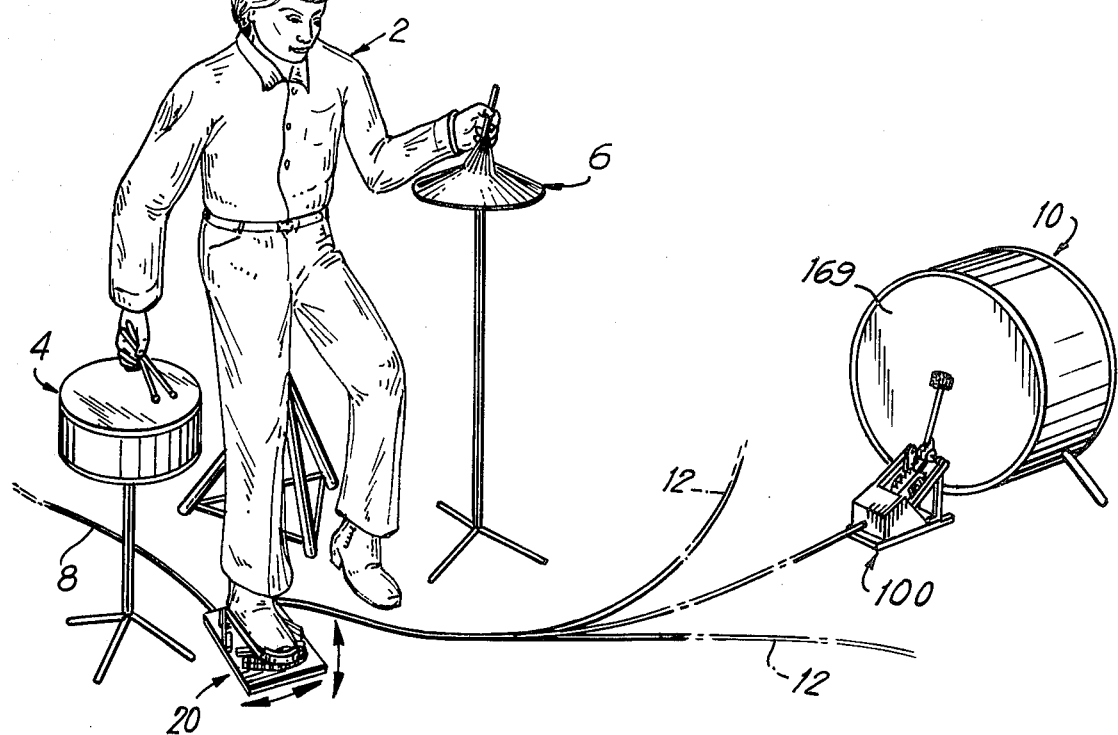
FIG. 1 is a perspective view of a drummer utilizing the power driven drum beater and foot pedal control device of the present invention.
Figure 2:
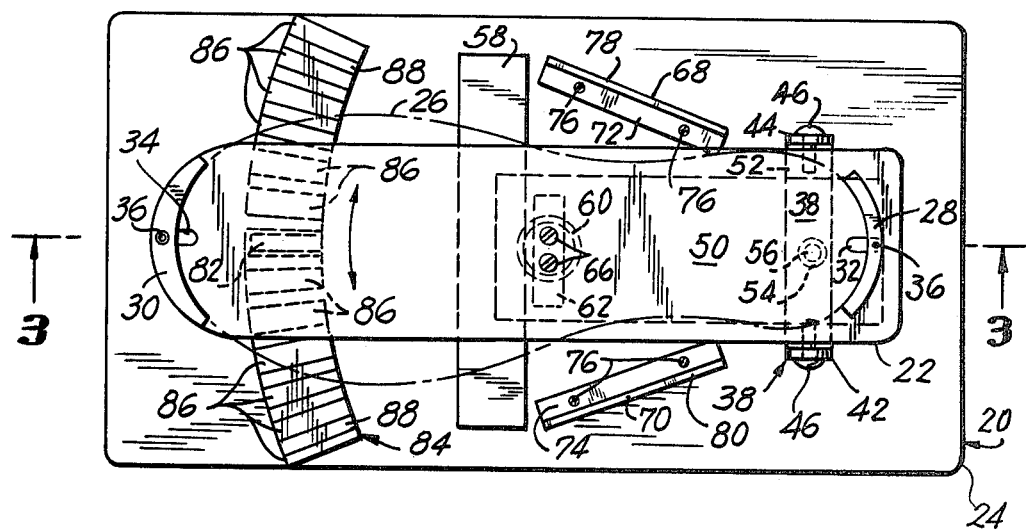
FIG. 2 is a plan view of a preferred embodiment of the foot pedal control device shown in FIG. 1.
Figure 10:
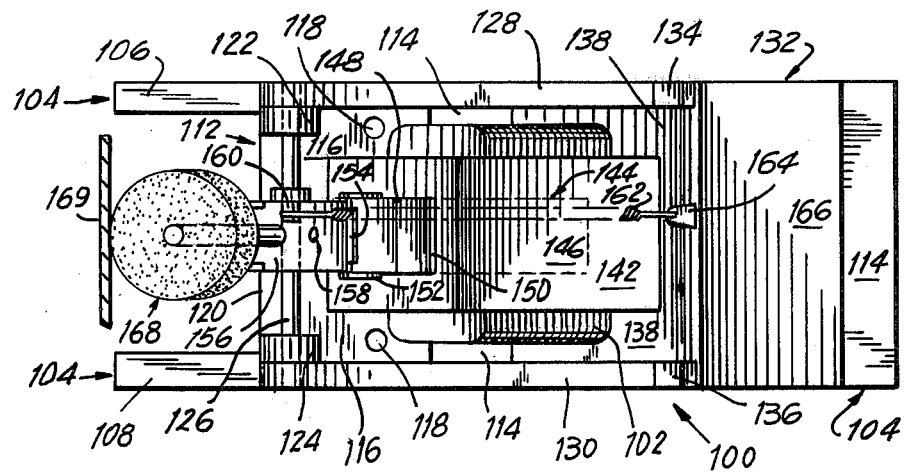
FIG. 10 is a plan view of the drum beater of the present invention.
Figure 11:
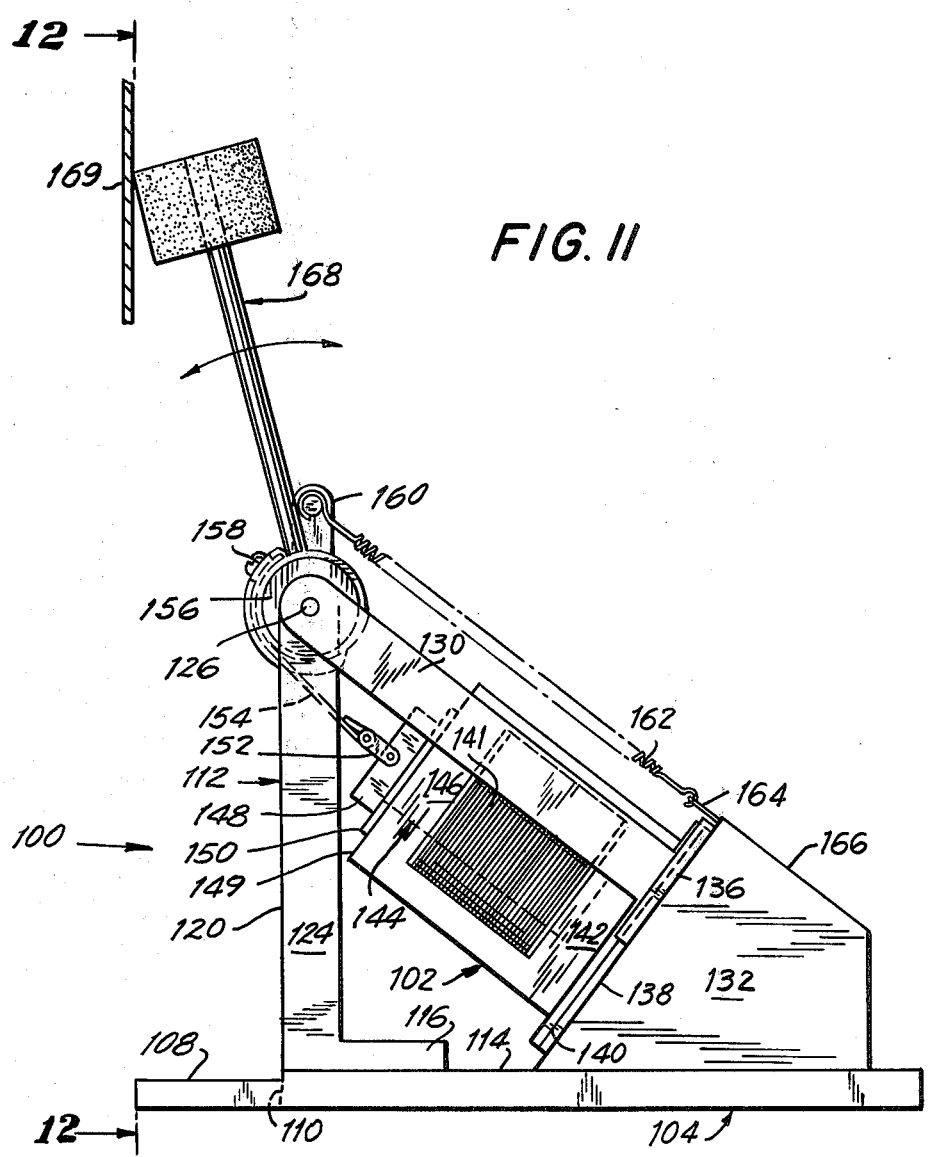
FIG. 11 is a side elevational view of the drum beater shown in FIG. 10.
Figure 12:
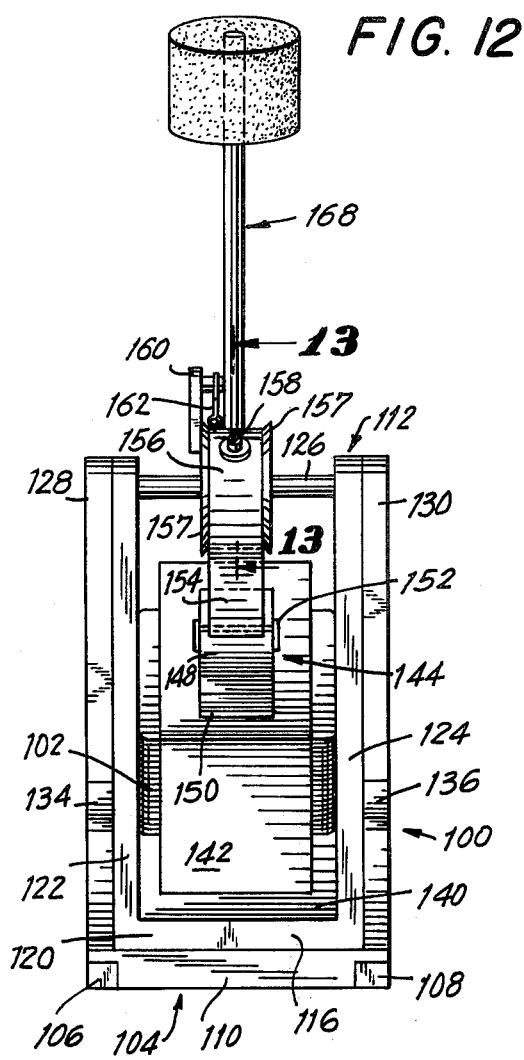
FIG. 12 is a front elevational view of the drum beater, taken along the line 12—12 of FIG. 11.

The invention, as best shown in FIG. 1, comprises a foot pedal device 20 and a drumstick device 100. A drum player 2 is shown employing the invention in conjunction with other instruments, such as a snare drum 4 and cymbals 6, and he is shown beating a single bass drum 10. Since it is possible with the invention to provide means for beating more than one drum at a time, wires 12 leading to such other second and third drums are therefore shown in phantom, as well as a power supply wire 8 connected to the pedal control device 20.

Referring now more particularly to FIGS. 2-5, the foot pedal device 20 generally comprises two basic parts, a foot pedal 22 and a foot pedal base 24. The foot pedal 22 is preferably made in the general shape of a foot or shoe. FIG. 3 shows in phantom a shoe 26 resting on the foot pedal 22. A heel rest 28 and toe rest 30, preferably arcuate in shape, are respectively disposed at the front and rear of the foot pedal 22 to hold the shoe 26 securely in place on the pedal. The inherent friction interaction between the outer sole of the shoe 26 and the top surface of the foot pedal 22 which may have an abrasive coating also assists in maintaining the position of the shoe 26 of the foot pedal 22. Side restraining elements (nto shown) may be put on each side or edge of the foot pedal 22 to further assist in holding or maintaining the shoe 26 in a satisfactory position on the foot pedal 22. Of course, if desired the shoe may be strapped to the pedal 22 to hold it in place. Elongated slots 32 and 34 may be provided may be provided on at least one end of the foot pedal 22 to accommodate various sized shoes, and perhaps so as to facilitate the positioning of the toe rest 30 or the heel rest 28, as may be desirable. In this ocnnection, adjustment screws 36 extend through the slots 32 and 34 from underneath the pedal 22 and are screwed into suitable tapped holes in the heel rest 28 and the toe rest 30. Because of the generally elongated slots 32 and 34, the adjustment screws 36 may be loosened and the heel rest 28 or the toe rest 30 may be moved to different positions on the foot pedal 22 to accommodate different length shoes as noted hereinabove.

It is also possible to permanently fix either or both the heel rest 28 and the toe rest 30 to the pedal 22. With such a construction, it would be necessary to manufacture the foot pedal 22 in different sizes to accommodate different shoe sizes. The foot pedal may be made of any suitable material, preferably a material which is relatively strong and nonconductive. The top surface of the foot pedal 22 may be made rough or covered with a frictional type of material in order to give the frictional resistance needed to keep the shoe 26 in place during depressing and swiveling of the pedal 22. The U-shaped bracket 38 is used to pivotably support the foot pedal 22. The aperture 40 in the upper portion of each upright 42 and 44 of the U-shaped bracket 38 and the pivot pin 46 provide a horizontal pivot axis for the foot pedal 22. The bracket 38 is pivotably secured in any suitable manner to the rear side portion of the foot pedal 22. The diameter of the aperture 40 is larger than the diameter of the pin 46, thus enabling the foot pedal 22 to move in a vertical plane with respect to the bracket 38.

A suitable flat washer 48 is disposed between the bracket 38 and the foot pedal base 24 and a connecting strip 50 is suitably secured to the bottom yoke portion 52 of the bracket 38. Apertures 54 are provided in the connecting strip 50 and the bottom yoke portion 52 of the bracket 38; and a suitable picot or swivel pin 56 extends through the apertures 54 and the flat washer 48. The pin 56 may be secured in place by any suitable means and, in the drawing, a rivet is illustrated for purposes of convenience. The diameter of the apertures 54 in the connecting stip 50 and the bottom portion 52 of the bracket 38 are larger than the diameter of the swivel pin 56, thus enabling the bracket 38 and the connecting strip 50 to move in a horizontal plane with respect to the foot pedal base 24. Because of the dual axis pivot means provided by the bracket 38 which is connected to the foot pedal 22 and the pedal base 24, the foot pedal 22 is free to move in a limited range in both horizontal and vertical planes. If desired, the bracket 38 and strip 50 may be of one-piece construction.

The connecting strip 50, which is preferably rectangular in shape, is secured at one end by the bolt or pin 56 to the bracket 38 and its other end, it is supported by a rectangular block or support 58. The support 58 is secured in any suitable manner to the foot pedal base 24 and the support 58 is of the same height as the height of the upper surface of the bottom portion 52 of the bracket 38 from the pedal base 24, so as to enable the connecting strip 50 to lie flat across the two portions or elements. The support 58 is preferably provided with a smooth frictionless like finish to enable the connecting strip 50 to slide easily along its surface. A spring 60 is placed between the connecting strip 50 and the bottom side of the foot pedal 22. Flat rectangular blocks 62 are wedged between the last two coils one each side of the spring 60 and suitably, nuts 64 and bolts 66 are used to secure the blocks 62 to the foot pedal 22 and to the connecting strip 50, thus securing the spring 60 in place to the foot pedal 22 and the connecting strip 50. The connecting strip 50 being solidly connected to the bottom portion 52 of the bracket 38 allows the foot pedal 22, spring 60 and strip 50 to move as one in a horizontal plane. By restricting the motion of the connecting stip 50, the motion of the foot pedal 22 is also restricted. In this regard, two limit stops 68 and 70 are suitably secured to the foot pedal base 24 to restrict the motion of the connecting strip 50 and, hence, the motion of the foot pedal 22. The limit stops 68 and 70 are sturdy, strong right angled elements capable of stopping the sideways motions of the connecting strip 50. The bottom sides 72 and 74 of the limit stops 68 and 70 are shown secured to the foot pedal base 24 by means of screws 76. The vertical side components 78 and 80 are parts of the limit stops 68 and 70 that actually restrict the motion of the connecting strip 50. The limit stops 68 and 70 are positioned at predetermined points where it is desired to prohibit further horizontal motion of the foot pedal 22 in such sideways directions.

The function or purpose of the spring 60 is to restore the foot pedal 22 to its initial elevation after it is depressed. Thus, after one presses down on the foot pedal 22 and the foot ceases to exert pressure downwardly, the spring 60 restores the foot pedal 22 to its initial position.

An electrical contact element or point 82 is placed on the bottom side of the foot pedal 22, and this element or contact point 82 should be made of a material that is conductive or conducts electricity. It may be rectangular in shape, although any shape would serve just as well. A wire (not shown) is connected to the contact point 82, by any suitably manner, and leads to the power supply (not shown). This wire may be on the bottom side or the inside of the foot pedal 22.

A contact supporter 84 is secured in any suitable manner as by screws (not shown) or adhesives, such as glue, to the foot pedal base 24. This contact supporter 84 is preferably in the shape of an arc, the radius of which is the radius that will give the contact supporter 84 a shape that will closely follow the horizontal swivelled path of the contact point 82. It should be made of a non-conductive material, such as wood or plastic. A plurality of mating electrical contacts 86 are spaced at equal intervals along the top surface 88 of the contact supporter 84 and each contact 86 is made of a suitable electrically conductive material. Each contact 86 is independent of each of the other contacts 86 and the foot pedal 22 is provided with sufficient horizontal movement so that it can reach a position above each individual contact 86. When the foot pedal 22 is depressed it will cause the contact point 82 to come in contact with one of the contacts 86, thus completing the electrical circuit. Since it may be desirable for a drummer 2 to know where his foot, and thus the contact point 82, is relative to the contacts 86, the following ways can determine when the contact point 82 of the foot pedal 22 is over a particular contact 86. Notches (not shown) may be put on the support 58 and each notch would correspond to a different contact 86. The connecting strip 50 would be provided with a mating detent which would fall into a notch whenever the contact point 82 of the foot pedal 22 is above a contact 86. Another simpler method is to provide a small arrow (not shown) on the front of the foot pedal 22. An arc shaped plate (not shown) is secured at the front end of the foot pedal base 24 and marks representing the various contacts 86 would be inscribed on the plate. When the arrow points to a mark, the drummer 2 would know that the contact point 82 of the foot pedal 22 is over a particular contact 86. There are many other ways for the drummer 2 to determine where the foot pedal 22 actually is and the present invention works correctly just as easily without any guide means.

FIG. 6 shows an alternate way to attach the previously described spring 60 of FIGS. 1–5. As shown therein, the spring 600 has the same purpose as the spring 60. The top portion 602 of the spring 600 is set into a recess or cup 604. This cup 604 is secured, in any suitable manner, such as by a screw 606, to the foot pedal 22. The top portion 602 of the spring 600 may also be secured to the foot pedal 22 in the manner previously described for spring 60. The bottom portion 608 of the spring 600 is set into a recess or cup 610 having a shaft or pin 612 extending axially outwardly therefrom. This pin 612 is completely threaded and at its lower end 616 extends through a tapped hole in the connecting strip 50. A nut 614 is secured by any suitable means to the lower end 616 of the pin 612. The turning of the nut 614 will thus cause pin 612 to move through the tapped hole in the strip 50. Thus, by turning nut 614, and by suitably fixing the angular separation of the foot pedal 22 with respect to the strip 50, the distance from the cup 610 to the connecting strip 50 and therefore, the tension on the spring 600 may be increased or decreased, as desired. By increasing or decreasing the tension, the operator or drummer may make it easier or harder to depress the foot pedal 22, as he so desires for his own feel or touch.

FIG. 7 shows a self-centering foot pedal 22 where spring-loaded limit stops 700 and 702 are placed on each side of the foot pedal base 24. The limit stops 700 and 702 are secured, in any suitable manner, as by screws or adhesives, to the foot pedal base 24. Each limit stop 700 and 702 has a spring 704 or 706 (of equal size and strength) secured thereon in any suitable manner. When the foot pedal 22 is moved left or right, connecting strip 50 compresses the spring 704 or 706 on that side. After the motion is stopped and the foot pressure has been released from the pedal 22 the spring 704 or 706 returns to its normal position, thus pushing the connecting strip 50 back to the desired neutral or center position, which thereby returns the foot pedal 22 to its center position.

FIG. 8 shows a modified foot pedal embodying an alternate method to achieve the vertical motion of the foot pedal 22. The top portion 804 of a hinge 800 is secured to the bottom of the foot pedal 22 in any suitable manner, such as by screws 802. The lower portion 806 of the hinge 800 is likewise secured to the top of a rectangular block 810 by screws 808. This combination allows the foot pedal 22 to move in the vertical plane. The block 810 is provided with a pivot pin 812 passing through apertures in the connecting strip 50, the washer 814, and the foot pedal base 24. Thus, the pin 812 enables the block 810 to rotate thereabout, giving the foot pedal 22 movement in the horizontal plane.

The connection strip 50 may be attached to the block 810 by any suitable means, such as by screws 809. This allows the connecting strip 50 and appurtenances to move horizontally as one with the pedal 22. The back of the block 810 is preferably formed in a desired way or constructed so as to constitute a limit stop precluding the further upward vertical motion of the pedal 22 as caused by the action of the return spring 60, see FIGS. 3 and 8. Other suitable methods of limiting this vertical motion include the incorporation of a rigid stop (not shown) held in place by any sturdy means at a predetermined location over the top of the pedal 22. A stop of this type may be surfaced with an impact absorbant material to reduce noise. Vertical motion can also be limited by means of any fixed length flexible connector (not shown) attached from the pedal 22 to any suitable member such as to the connecting strip 50. Suitable material for this flexible connector may be wire braid cable, leather, plastic, sturdy cloth, etc. Of course the methods of limiting vertical motion of the pedal 22 described above may be applied to other forms of horizontal or vertical motion as described herein.

FIG. 8 also shows a limit stop for the foot pedal 22 which is in the form of a pin 816 secured (shown threaded) into the foot pedal 22. The pin 816 passes through an aperture in the connecting strip 50 and comes to rest in a blind hole 818. This pin 816 should be of a very strong material as it acts as a limit stop for the foot pedal 22 stopping it at a predetermined point thus preventing contact 82 from causing damage to any lower contact 86 or a limit switch 1,500 (described with respect to FIGS. 21 and 22). This limit stop may, of course, be used with either means of vertical motion. The limit stop is not essential to the operation of the invention and may be omitted, but it may be desirable so as to preclude a careless drummer from possibly damaging the foot pedal of the invention.

Referring now to FIG. 9, the wiring of the foot pedal device 20 is shown therein. As illustrated, wire 90 connects the power supply to the contact point 82 on the foot pedal 22. Wires 92 connect each contact 86 on the contact support 84 to a point on a suitable resistance coil 94. A wire 96 from the resistance coil 94 goes to the drumstick device 100 and as can be readily seen, each wire 92 leads to a different resistance on the resistance coil 94. The purpose of having a plurality of contacts 86 is to have a plurality of different resistance values. The current in a wire is inversely proportional to the resistance in the wire. Having a plurality of different resistance values makes it possible to have a plurality of different currents in wire 96. Wire 96 ultimately leads to the coil winding 141 of the solenoid 102 which will be described hereinafter in connection with the drum beater. The magnetic field induced in this solenoid 102 is proportional to the current. For this reason, different magnetic field values are obtained when one uses different contacts 86 on the contact supporter 84.

Referring now to FIGS. 10–14, a drumstick device 100 is shown. The drumstick base 104 is suitably rectangular in shape and a pair of legs 106 and 108 extend out of the front portion 110 of the drumstick base 104. A U-shaped support 112 extends upwardly from the top surface 114 of the drumstick base 104 and the base 116 of the support 112 is suitably secured to the drumstick base 104 by means of screws 118. For aligning the drumstick device 100 with the rim 2,154 of the drum 10, the front end 120 of the support 112 is lined up with the front portion 110 of the drumstick base 104. Left and right upright supports 122 and 124 extend from the base 116 of the support 112 and apertures are provided at the upper end of the left and right upright supports 122 and 124. An axle 126 extending between the left and right upright supports is supported by said apertures. Diagonal supports 128 and 130 are suitably attached to the upright supports 122 and 124, as by welding, as structural reinforcements against the horizontal components of the various forces imposed upon the axle 126. A mounting block or cube 132 is suitably secured on top surface 114 of the drumstick base 104 and the feet or bases 134 and 136 of the diagonal supports 128 and 130 are suitably secured to the diagonal face 138 of the mounting block or cube 132. The base 140 of the solenoid housing 142 is also suitably attached to the diagonal face 138 of the mounting block or cube 132.

Figure 13:
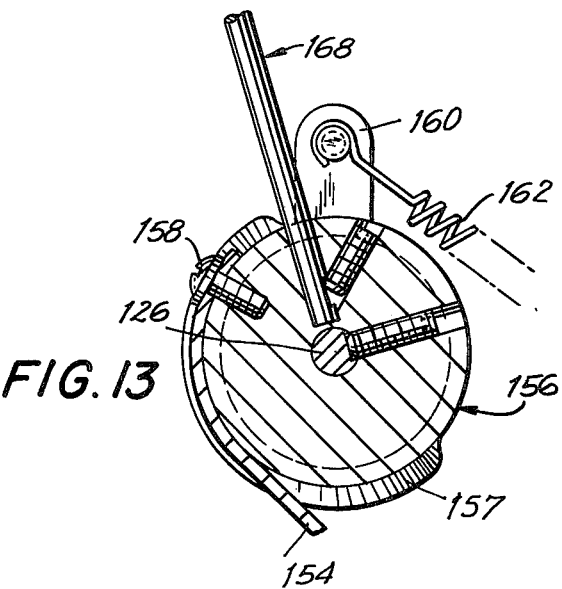
FIG. 13 is a sectional view, taken along the line 13—13 of FIG. 12.

A solenoid 102 placed in the solenoid housing 142 is provided with a plunger 144 having a shaft 146 and a suitable head portion 148. The shaft 146 of the plunger 144 fits into an internal magnetic field channel the opening of which is common to both the solenoid housing 142 and the solenoid 102. If desired, a resilient, damper-like pad 150 at the top or lower end of solenoid housing 142 may be provided so as to aid in absorbing impact forces of the plunger on the solenoid and also serves to minimize noise. When the solenoid 102 has drawn the plunger 144 to its limit of movement, or when the head 148 of the plunger 144 hits against the damper pad 150 or shoulder 149 (in absence of a pad) of the solenoid housing 142, further movement of the shaft 146 of the plunger 144 into the channel inside the solenoid housing 142 and the solenoid 102 is curtailed. A suitable connection means 152 is attached to the head 148 of the plunger 144 and a flexible sheet like material, such as a wire mesh, heavy cloth, leather, steel tape 154 or other like material is attached thereto. A wheel 156 having radially extending peripheral edge portions 157 for guiding the tape 154 in place about the wheel is placed on the axle 126 between the upright supports 122 and 124 and the tape 154 is attached thereto by any suitable means, such as screw 158. A leg 160 may be part of or is rigidly attached to one side of the wheel 156. An extension spring 162 is suitably secured to this leg 160 extending from the wheel 156 and has its other end attached to a hook 164 secured adjacent the intersection of the left diagonal face 138 and the right diagonal face 166 of the block or cube 132. A drumstick 168 is further embedded into and otherwise secured by fastening to the wheel 156, such as by means of a set screw bearing into a notch in the stick 168 (see FIG. 13). As also shown in FIG. 13, another suitable pin means, such as a set screw rigidly secures the wheel 156 to the axle 126.

Upon closing of the electrical circuit, the solenoid 102 generates a magnetic field and this field causes the plunger 144 to be pulled or moved down through the channel inside of the solenoid 102. The stronger the magnetic field, the faster the plunger 144 moves. The steel tape 154 also moves when the plunger 144 moves and the movement of the steel tape 154 causes pulley means or wheel 156 to be set in motion, which in turn causes the drumstick 168 to move pivotably about the axes of the pulley means or axle 126. When the circuit is opened, the drumstick device or system, including the wheel 156 and drumstick 168, tape 154 and plunger 144, returns to its normal position by means of the spring 162. Thus, when the plunger is pulled "down", the linear energy is transformed into rotational energy propelling the beater head towards the drum head. The power to the solenoid, which governs both the timing and volume of the beat produced, is regulated by the foot control device.

The foot control device 20 acts to select a desired power setting, initiate the deliverance of such power to the solenoid and cut such power when no longer desired. In this manner the foot control device 20 as operated by the player 2 is capable of controlling both the timing and intensity (volume) of each beat. A means of predetermining the starting position of the drumstick device or system may be desired to help insure a consistent volume for each beat produced at any one power setting. This means may be a rigid stop (not shown) secured from any suitable stationary component of the beater device 100 to a point either above the head 148 of the plunger 144 of the solenoid 102 or behind the drumstick 168. This serves to limit the returning action of the drumstick device or system. This stop may be covered with any suitable impact absorbing material to aid in reducing the noise resulting from the impact of the returning component with the stop.

Figure 14:
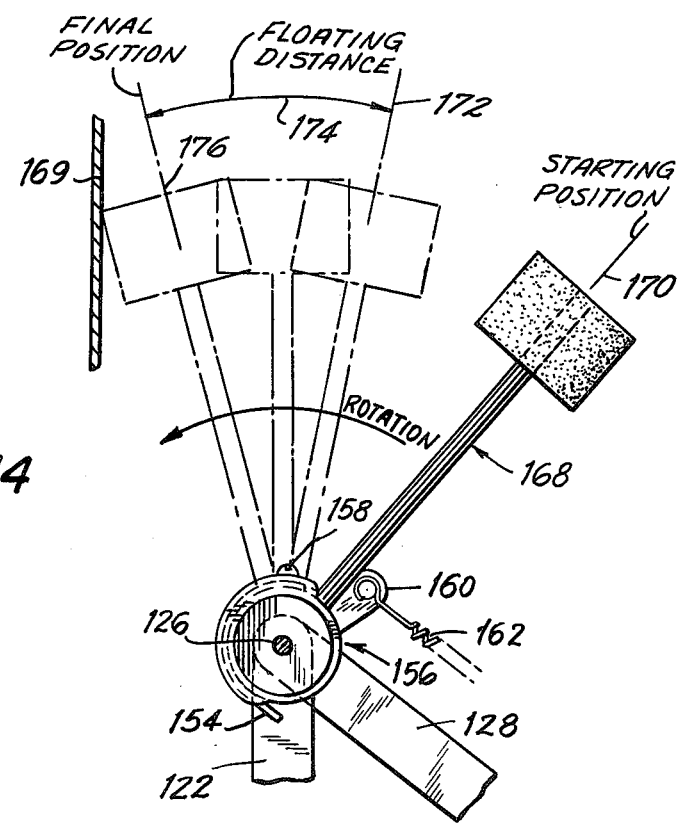
FIG. 14 is a fragmentary view of the drum beater showing it in phantom in a plurality of positions prior to striking the drum.

Referring now to FIG. 14, the drumstick 168 is at a starting position 170, which is the same as its normal position. The position of the drumstick 168 when the plunger 144 is at its lowest position may be called for convenience the intermediate position 172. The closing action of solenoid 102 exerts a positive mechanical force upon the drumstick device or system as the drumstick 168 moves from position 170 to position 172. During this time the drumstick and related components gain a certain degree of angular momentum. At position 172 the solenoid plunger 144 has reached its limit of motion and will therefore no longer impart further driving force to the drumstick device or system. The momentum of the drumstick 168 at the intermediate position 172 moves the drumstick 168 through a floating distance 174 to its final position 176. At the final position 176, the drumstick 168 is in contact with the drum head 169. The floating distance 174 is established so as to ease the force with which the drumstick 168 strikes the drum head 169.

It is possible to construct the invention with no floating distance 174, where the intermediate position 172 is the final position 176. However, this can produce several undesirable results. This beater floating distance is considered important for the term as used herein refers to the final segment of beater travel, during which the only positive force acting on the beater head, rod, etc., is the inertia gained in the first phase of the beater stroke. This feature aids in protecting the drum head from excessive force and permits the beater to rebound after striking the drum. Such rebound has two benefits; one is that it eliminates "buzz" produced by extended beater contact with the drum head and further aids in resetting the mechanism for the next stroke.

Figure 23:
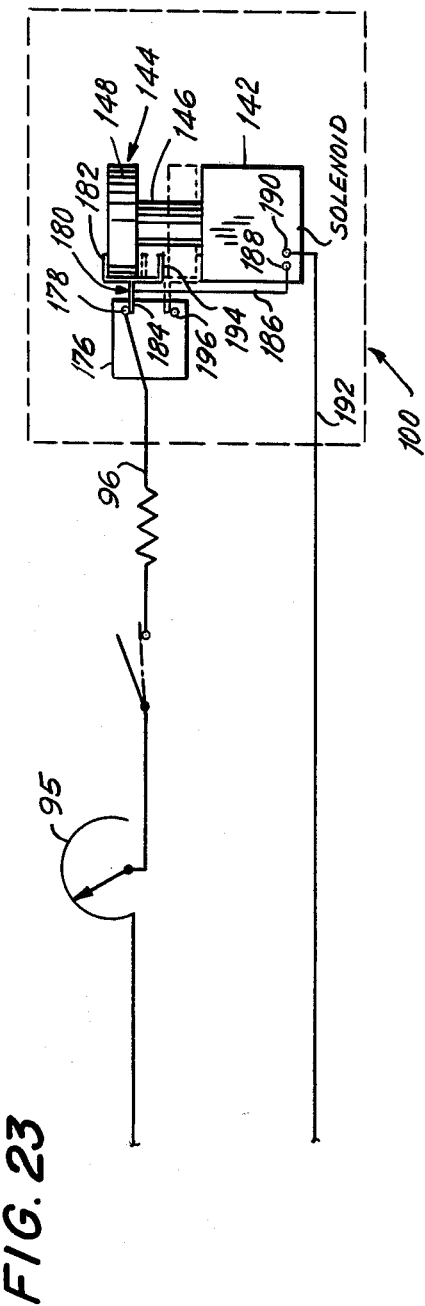
FIG. 23 shows a simple wiring diagram of the invention, specifically illustrating a rapid beat and the plunger's effect on the electrical circuit thereof.

A method of wiring the drumstick device 100 is shown in FIG. 23. As shown therein, the wire 96, which leaves the resistance coil 95 leads to the drumstick device 100 and terminates on a contact 178 of the limit switch 176. The plunger 144 in its normal position has the top side 182 of a Y bar 180 resting on its head 148. The base 184 of the Y bar 180 touches the contact 178. A wire 186 is connected to base 184 of the Y bar 180 in any suitable manner, as by soldering. The wire 186 leads to a contact 188 of the solenoid 102 and a wire 192 from the solenoid 102 at contact 190 leads to the power supply (not shown). When current flows in the circuit, the solenoid 102 generates a magnetic field which causes the plunger 144 to move downward through the channel inside the solenoid 102. When the plunger 144 moves down, it eventually touches the bottom side 194 of the Y bar 180. The plunger 144 then moves the Y bar 180 with it, thus separating the base 184 of the Y bar 180 from the contact 178, which then opens the circuit and prevents current flow. Point 196 is the resting point of the base 184 of the Y bar in the final position. The aforementioned spring 162 now moves the wheel 156 to its normal position, which also returns the plunger 144 to its normal position. The base 184 of the Y bar 180 is again touching the contact 178. If the foot pedal 22 continues to be depressed, the previously described action will repeat itself and the drumstick 168 will again strike the drum head 169. This repeated striking of the drum head 169 by the drumstick 168 causing a series of automatic beats when the foot pedal 22 is kept depressed is called a rapid beat. The rapid beat is stopped upon releasing the foot pedal from the contacts.

Of course, this circuit may be further simplified by the omission of the limit switch 176. Wire 96 would then lead directly to the contact 188 on the solenoid 102 instead of to the contact 178 as shown in FIG. 23. The resultant functional difference would be that the player 2 would not be permitted to initiate more than one beat each time the pedal is depressed. The omission or by passing of the limit switch 176 may be accomplished by the installation of a manual or foot operated selector switch to be controlled by the player 2. Thus, the player could select different beater responses to correspond with typcial depressions of the foot control pedal 22.

FIG. 20 shows the preferred rectangular shape of the contacts 86. However, the more preferred contacts 86 may be substituted with round accent switches, as shown in FIG. 21. FIG. 22 is representative of a single accent switch arrangement on the base of a foot contnrol device. It is also possible to make the metal contact 82 and the contacts 86 of other shapes, but it is preferable that they both be of the same shape and size so there is no overlapping, and to insure that only one contact 86 is contacted by the contact 82 at any given time.

FIGS. 15 and 16 show a single adjustable accent switch 1,500 which may be used in lieu of the contact 86, or in conjunction therewith. The purpose of this accent switch 1,500 is to allow the drummer 2 to choose between two vastly different resistances (such as $R_1$ and $R_2$) without moving the foot pedal 22. Such a switch enables a player to accent any beat by pressing harder on the pedal, and this may be critical in a situation where the player has little time to swing the control pedal 22 from a soft beat to a loud beat and back again. The accent switch 1,500 is preferably comprised of a housing 1,502, a plunger 1,504, a low resistance contact 1,406 and a plunger return spring 1,508. The housing 1,502 has a hollow cylindrical shape formed by tube 1,510 and a flange or disc shaped base 1,512, whose outside diameter is larger than that of the tube 1,510. The plunger 1,504 has a head 1,514, and a threaded shaft 1,516. The shaft 1516 of the plunger 1,504 fits into a self-locking threaded (adjustable) spring cup 1,520 inside the housing 1,502. The spring 1,548 fits around the upper end 1,522 of the shaft 1,516 of the plunger 1,504. The spring cup 1,520 is threaded about the upper end 1,522 of the shaft 1,516 of the plunger 1,504 and therefore provides for adjustment of the spring tension to suit a player. The upper end of the spring 1,508 is seated within the cup portion 1,524 of the spring cup 1520. The lower end of the spring 1,508 is seated inside another cup 1526 resting on an internal flange or projection 1,528 extending in radially from the housing 1,502. The lower end 1,530 of the shaft 1,516 of the plunger 1,504 is threaded and is provided with a retaining washer or disc 1,532 to guide the plunger through the channel inside the housing 1,502. A nut 1,518 holds the washer in place. A wire 1,534 connects the plunger 1,504 to resistance $R_1$ and a wire 1,536 from the low resistance contact 1,506 leads to resistance $R_2$. 506, When the contact 82 of the foot pedal 22 just touches the head 1,514 of the plunger 1,504, the current flows through the contact 82, the plunger 1,504, the wire 1,534 and the resistance $R_1$ and then travels through the wire 1,538 to the drumstick device 100. When the foot pedal 22 is depressed with a force great enough to overcome the spring froce of the spring 1,508, the plunger 1,507 is driven down, the lower end 1,530 of the shaft 1,516 of the plunger 1,504 is made to touch the low resistance contact 1506, and current will now flow in wire 1,536 as well as in wire 1,537. This movement closing the accent switch circuit gives the beater solenoid added power to produce a louder beat. After the foot pedal 22 is released, the spring 1,508 will cause the plunger to return to normal, thus separating the lower end 1,530 of the shaft 1,516 of the plunger 1,504 and the low resistance contact *1506*.

FIG. 17 shows an alternate embodiment of the accent switch 1,500 of the non-adjustable type, now designated 1,700. The accent switch 1,700 is preferably made up of a cube 1,702 with a cutout or step 1,704, a low resistance contact 1,706 and a resilient contact arm 1,708. The contact arm 1,708 is preferably secured to the top side 1,714 of the cube 1,702 by screws 1,712. The low resistance contact 1,706 is secured to the step 1,704 of the cube 1,702. When the contact 82 of the foot pedal 22 just touches the contact arm 1,708, current flows from the contact 82 through the contact arm 1,708 and the wire 1,534. When pedal 22 is depressed with sufficient force so that the contact 82 of the foot pedal 22 causes the end portion 1,710 of the contact arm 1,708 to touch the low resistance contact 1,706, current flows in wire 1,536 as well as in wire 1,534. When the foot pedal 22 is released, the resiliency of the lever arm 1,708 returns itself to normal position, thereby separating the end portion 1,710 from the contact 1,706.

FIGS. 18 and 19 show the effect of either the adjustable or non-adjustable accent switch on the wiring, that is simply providing the addition of a smaller resistance connected in parallel with the original resistance. FIG. 18 shows current in wire 1,534, but not in wire 1,536, and FIG. 19 shows current in both wire 1,534 and in wire 1,536. When current flows only through the wire 1,534 and the large resistance $R_1$, the circuit works the same as it did for a contact 86 which generates a regular beat. When current flows through both wire 1,534 and 1,536, the resistances $R_1$ and $R_2$ are in parallel. However, $R_2$ is made much smaller than $R_1$ so that the circuit can be approximated by just having current in wire 1,536 and not in wire 1,537. This effect can give the drummer 2 the ability to have a soft (regular) beat followed by a loud (accented) beat without moving the foot pedal 22 horizontally. He simply depresses the foot pedal 22 relatively lightly so as to engage only the resistance $R_1$ for a soft beat. When a loud or accented beat is desired he would then depress the pedal relatively heavily so as to engage both resistances $R_1$ and $R_2$. A close comparison can be made between this operation and the physical means by which a drummer achieves an accented beat using the conventional "manual" beater. In effect, this smaller resistance will act almost like a bypass of the larger, original resistance, thus giving more power to the beater solenoid. Due to the fact that the devices 1,500 and 1,700 are only switching means their use is of course not limited to that previously described. These units may be applied in any suitable situation which requires the discrimination between two circuits in response to either linear or circular motion in the plane of the upper and lower contacts or increased or greater pressure induced at the top of the upper or first contact.

The master volume selector 95 shown in the FIGS. 18 and 19 is simply a first resistance selector, the purpose of which is to limit the power input to suit the needs of the performance. For example, a drummer would require a lower power range in a small room than he would in a larger room and such master volume control provides the means in which to do so. The second resistance selector of the system of the present invention is the contacts 86 connected to various resistances. The choice of a particular resistance and, simultaneously, the initiation of a beat is made by first moving the control foot pedal (left or right) over the resistance contacts and then depressing the foot pedal so as to make an electrical connection between the particular resistance contact and the pedal contact. This player action allows the desired current to pass to the power solednoid of the drum beater, thus producing the desired or expected beat.

Figure 24:
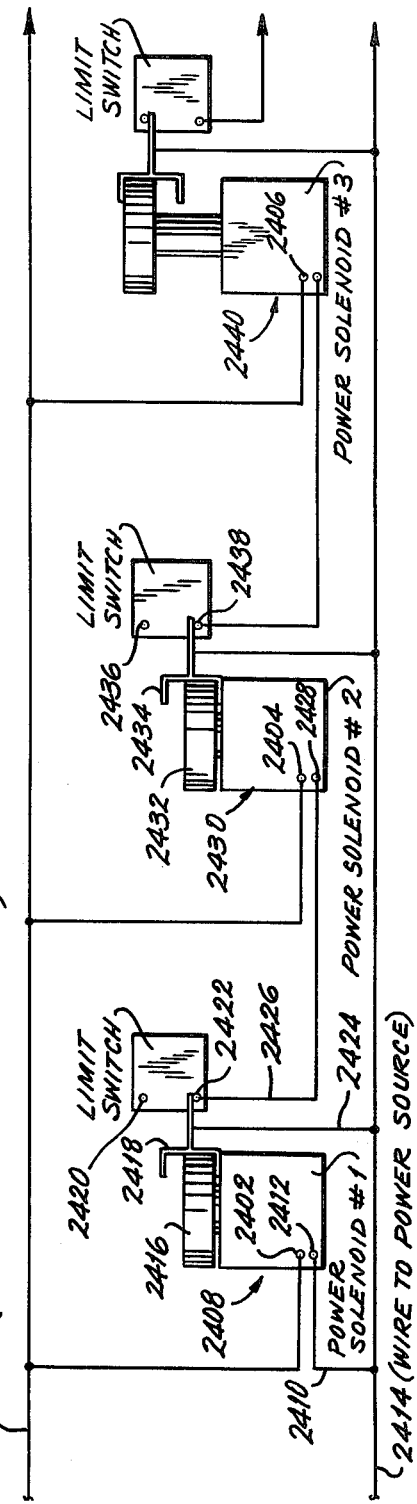
FIG. 24 illustrates a suitable wiring diagram for a stratified beat.

FIG. 24 shows the wiring needed to obtain a stratified beat or a rapid series of beats, preferably each beat on a different drum. A stratified beat occurs when two or more drumsticks beat on two or more drums in a rapid, sequential manner. It could also be when two or more drumsticks beat on a single drum. The first beat of the stratified beat is initiated by the player. As shown in FIG. 24, the action of the first beater unit acts to trigger the action of the second beater unit and so on. This chain continues until the last drumstick beats a drum. The stratified beat may be activated by a foot switch mounted on the foot control base. In FIG. 24, the wire 2,400 is connected to the contacts 2,402, 2,404 and 2,406 on each of the solenoids. The first drumstick device 2,408 has a wire 2,410 leaving contact 2,416 of the solenoid. Wire 2,410 is connected to wire 2,414 which leads to the power supply. The circuit is complete; therefore, the plunger 2,416 moves downward. This causes the first drumstick to beat a drum. This motion also moves the first Y bar 2,418 from its rest point 2,420 to the contact 2,422. The Y bar 2,418 has a wire 2,424 connecting it to contact 2,428 of the solenoid of the second drumstick device 2,430. The circuit of the second drumstick device 2,430 is now complete; therefore, the plunger 2,432 moves down. This will cause the second drumstick to beat a drum. The second Y bar 2,434 will move from a rest point 2,436 to a contact 2,438. This will now effect the thrid drumstick device 2,440, the same way as this similar action of drumstick device 2,408 effected the second drumstick device 2,430. This process will continue until all the drums beat. Each drum will beat only once as this is a non-repeating circuit. The circuit will not repeat after the last beat, if you keep the foot pedal 22 depressed. You may only repeat the stratified beat by releasing the foot pedal 22 and then depressing it again. Upon releasing the foot pedal 22, a spring returns each plunger to its normal position.

FIGS. 25 and 26, show a device 2,500, for attachment on both sides of the drum beater, that allows the drummer 2 to attach the drumstick device 100 to the drum 10 so as to preclude the device from moving away from the drum during use. An extension spring 2,502 is attached to a lower tuning lug 2,504 on the drum 10 by any suitable means such as by a hooked rod 2,503 or a loop of wire braid cable (not shown). Of course, any suitable non extensive like material may be used as a connection means or if desired the spring 2,502 may be directly connected to the tuning lug 2,504. A support 2,506 is attached on the base 104 of the drumstick device 100. A shaft 2,508 extends through an aperture in the support 2,506 and a curved latch 2,510 is secured to this shaft 2,508. A handle 2,512 is attached to the latch 2,510 and the spring 2,502 is hooked onto the handle 2,512. When the latch 2,510 is in the down position, as shown in FIG. 25, the spring 2,502 is tight. On the other hand, when the latch 2,510 is lifted up, the spring 2,502 loosens up, so one can unhook the spring 2,502 from the lug 2,504 of the drum 10.

FIGS. 27 and 28 illustrate and show the operation of a pedal return solenoid 3,000 which gives to a drummer the feeling of beater rebound typical of a conventional drum beater. Thus, when the beater strikes the drum, a kickback is given to the pedal so as to enable a drummer to keep his "timing" and resetting his foot for the following beat or series of beats. The solenoid 3,000 is preferably of the push-type and is suitably mounted under the pedal return spring 3,002. The solenoid 3,000 is activated by a limit switch attached to either the main beater solenoid or to the beater rod, and the power to the solenoid 3,000 may be suitably regulated by a variable resistance 3,004. Accordingly, when the plunger of the main beater solenoid is pulled in (solenoid closes), the pedal solenoid is activated at a preset strength to push back on the player's foot. The wiring for the pedal return unit as diagramed in FIG. 28 is compatible with all wiring means as described herein. However, the present invention does not require the assistance of the pedal return solenoid to accomplish its fundamental purposes.

In view of the fact that a beater solenoid generates heat during use, it may be desirable to be able to switch beater solenoids if one beater solenoid gets too hot. In such an arrangement, two beater solenoids sid by side on a single drum may be used, with suitable switching means, such as manual or foot operated, to switch from one to the other as desired. It is also possible to automate such operation by providing for the automatic switching from one to the other by means of a suitable thermostat connected to the solenoids. Of course, it is also possible to simply cool a solenoid so as to extend the allowable operation time of any solenoid and reduce the time required for the solenoid to dissipate stored heat when not in use.

The present invention enables a drummer to expend less energy than is normally required withh conventional drum beaters. Consequently, the player will experience less fatigue and further could generate a greater number of controlled beats in a given time period than with prior art equipment. In addition, the present system provides for the relocation of the bass drum, thereby relieving the congestion now typical of the larger drum sets, and permitting the substitution of other drums, cymbals, etc., in this space. Better sound distribution and "stereo effect" would also thereby be achieved by such a separation of the bass drum drom the remaining portions of the drummer's set. Moreover, a system of these units connected to different size, toned and tuned drums will allow the drummer to play melodic lines and "foot" solos previously not possible. As a result of the device being electrically driven and controlled, a wide range of beat sequences are now possible, such as the rapid beat sequence or the stratified beat sequence. It should also be appreciated that the volume of the beat may be altered either by the presetting of a master volume selector or by player foot control. In tests conducted with a foot control device and electric solenoid operated beater of the prsent invention, the time for total stroke was about 0.039 sec. (as compared to about 0.06 sec. for only the forward stroke of "manual" beater). Due to decreased resistance to foot motion, with the device of the present invention, tests showed an improvement in "musician's" speed of up to 50%. Other obvious advantages included a noticeable reduction in musician fatigue.

While the invention has been described, disclosed, illustrated and shown in terms of an embodiment or modification which it has assumed in practice, the scope of the invention should not be deemed to be limited by the precise embodiment or modification herein described, disclosed, illustrated or shown, such other embodiments or modifications as may be suggested to those having the benefit of the teachings herein being intended to be reserved especially as they fall within the scope and breadth of the claims here appended.

What is claimed is:

1. A foot pedal control device for use in controlling an electric drum beater, comprising: base means, a foot rest mounted on said base means so as to be movable about a pair of axes; a plurality of first electrical contact means on said base means and second electrical contact means on said foot rest; biasing means maintaining a separation between said first and second contact means; and electrical circuit means including variable resistance means connected to each of said first contact means and to said drum beater for actuating same upon contact of said second contact menas with any one of said first contact means.

2. The foot pedal control device according to claim 1, wherein said variable resistance means is a rheostat and said first contact means are sequentially connected to said rheostat means, so as to provide a variable power source.

3. The foot pedal control device according to claim 1, wherein said pair of axes are mutually orthogonal to each other.

4. The foot pedal control device according to claim 1, wherein both of said axes are located at the same end of said base means and said foot rest.

5. The foot pedal control device according to claim 1, wherein one of said axes is vertically disposed and provides sideways swivel motion of said foot rest with respect to said base means, and the other of said axes is horizontally disposed and provides pivotable motion of said foot rest with respect to said base means.

6. The foot pedal control device according to claim 1, including stop means for said device for limiting the downward movement of said foot rest with respect to said base means.

7. The foot pedal control device according to claim 1, wherein said biasing means is a spring member.

8. The foot pedal control device according to claim 7, wherein said spring member is adjustably disposed so as to change the spring force.

9. The foot pedal control device according to claim 5, including stop means adjacent the sides of said base means for defining the range of angular swivel motion of said foot rest with respect to said base means.

10. The foot pedal control device according to claim 5, including heel and toe rest elements on said foot rest for aligning a shoe properly thereon.

11. The foot pedal control device according to claim 10, including skid resistance means on said foot rest for aiding in maintaining a foot on said foot rest as same is swiveled.

12. The foot pedal control device according to claim 1, including at least one accent switch serving as a first contact means, whereby a plurality of different beats may be generated upon contacting said second contact means with said accent switch.

13. The foot pedal control device according to claim 12, wherein said accent switch comprises a pair of contact elements, one of which is spring loaded, and the other being fixed; the first of said contact elements being connected to said drum beater for providing a generally soft beat, and the second of said contact elements being connected to said drum beater for providing a generally harder or louder beat.

14. The foot pedal control device according to claim 13, wherein said accent switch provides for a second resistance to be connected in parallel with the set resistance of said first contact element means.

15. The foot pedal control device according to claim 13, wherein the spring of said accent switch is adjustably disposed so as to change the spring force.

16. The foot pedal control device according to claim 1, including a pedal return solenoid disposed beneath said foot rest and being connected in said electrical circuit means for simulating the rebound or kickback of a conventional non-electric drum beater.

17. The foot pedal control device according to claim 16, wherein said pedal return solenoid is of the push type.

18. An ecettic drum beater for use with a bass drum or the like comprising: a base, solenoid means having a movable plunger, pulley means rotatively supported on said base and having a drumstick mounted thereon for pivotable movement of said drumstick about the axes of said pulley means, means connecting said pulley means to said movable plunger for rotating said pulley means and swinging said drumstick upon the activation of said solenoid means.

19. The electric drum beater according to claim 18, including biasing means for returning said pulley means and said drumstick to an initial position upon the deactivation of said solenoid means; and said solenoid means being of the pull type.

20. The electric drum beater according to claim 19, wherein said biasing means is a spring member of the tension type.

21. The electric drum beater according to claim 20, wherein the travel movement of said plunger is along an axis parallel to an axis passing through the axis of said spring member.

22. The electric drum beater according to claim 18, wherein said connecting means comprises a flexible sheetlike material adapted to be wrappable and unwrappable about said pulley means upon the rotation of same in response to the respective deactivation and activation of said solenoid means.

23. The electric drum beater according to claim 18, including shaft means for supporting said pulley means across a pair of upright support means secured to said base.

24. The electric drum beater according to claim 18, including means connecting said electric drum beater to said drum at a predetermined set distance for precluding said drum beater from moving away from said drum as a result of the rebound of said drumstick.

25. The electic drum beater according to claim 24, wherein said connecting means connecting said drum beater to said drum includes spring means and a pivoted latch mechanism for tensioning said spring member to a predetermined tension, whereby said spring means pulls said drum beater to said initial predetermined set position relative to said drum.

26. The electric drum beater according to claim 19, wherein said drumstick pivots from said initial position to a predetermined intermediate position and subsequently pivots a further floating distance prior to striking the drum at a final pivoted position.

27. An electric drum beater system comprising a beater device and foot control device; said beater device having a pivoted spring loaded beater and a pull type beater solenoid connected to said pivoted beater by connecting means; said foot control device having a foot pedal and base and a plurality of electrical contacts on said base; the foot pedal having a single contact element for mating contact with said contacts on said base, and being mounted on said base so as to be free to rotate about a pair of axes; variable resistance means electrically connected to said contacts on said base for providing a variable resistance to a power supply circuit connected to said contact on said foot pedal and to said solenoid for electrically pulsing said solenoid and activating said pivoted beater.

28. The system according to claim 27, including non-repeating circuit means having a plurality of drums and drum beaters separately arranged in said circuit means but in a chain or repeating series, whereby a first activated drumstick triggers a second drumstick circuit and so forth, generating thereby a single stratified rapid series of beats.

29. The system according to claim 27, including a pedal return solenoid, disposed beneath said foot pedal, and being connected in said power supply circuit for simulating the rebound or kickback of a conventional non-electric drum beater; said pedal return solenoid being activated by means of a limit switch connected to said beater solenoid or to said pivoted beater, so that when said beater solenoid is activated, the pedal return solenoid is activated to push back on said foot pedal.

30. The system according to claim 27, including at least one accent switch serving as one of said electrical contacts on said base, whereby a plurality of different beats may be generated upon contacting said second contact means with said accent switch.

31. The system according to claim 30, wherein said accent switch comprises a pair of contact elements, one of which is resiliently mounted, and the other being fixed; the first of said contact elements being connected to said drum beater for providing a generally soft beat, and the second of said contact elements being connected to said drum beater for providing a generally harder or louder beat.

32. The system according to claim 31, wherein said accent switch provides for a second resistance to be connected in parallel with the set resistance of said first contact element means.

33. The foot pedal control device according to claim 1, wherein said base includes a skid resistant lower surface for precluding excessive movement of the unit, relative to the floor, during operation of same.

34. The electric drum beater according to claim 18, wherein said solenoid means includes a resilient damper-like pad so as to absorb impact from said plunger and reduce operational noise of same.

35. The electric drum beater according to claim 18, wherein said pulley means includes edge guide means for precluding said connecting means from moving off said pulley means.

36. The electric drum beater according to claim 18, wherein said base includes a skid resistant lower surface for precluding excessive movement of the unit, relative to the floor, during operation of same.

37. The system according to claim 27, including a repeating circuit means having a single drum and a single drum beater with a limit switch attached to said solenoid means or said beater, whereby the first initiated closing action of said solenoid breaks the circuit to said solenoid and the subsequent opening action of said solenoid closes the circuit to said solenoid and so forth, generating a rapid series of beats continuing until such time as said first contact means and said second contact means are separated by said biasing means.

* * * * *